(12) United States Patent
Seo et al.

(10) Patent No.: US 10,368,277 B2
(45) Date of Patent: Jul. 30, 2019

(54) METHOD FOR TRANSMITTING DATA BY TERMINAL IN WIRELESS COMMUNICATION SYSTEM SUPPORTING HIGH-SPEED UPLINK, AND APPARATUS FOR SAME

(71) Applicant: LG ELECTRONICS INC., Seoul (KR)

(72) Inventors: Hanbyul Seo, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/579,411

(22) PCT Filed: Jun. 7, 2016

(86) PCT No.: PCT/KR2016/005980
§ 371 (c)(1),
(2) Date: Dec. 4, 2017

(87) PCT Pub. No.: WO2016/195450
PCT Pub. Date: Dec. 8, 2016

(65) Prior Publication Data
US 2018/0146402 A1    May 24, 2018

Related U.S. Application Data

(60) Provisional application No. 62/387,498, filed on Dec. 24, 2015, provisional application No. 62/171,250, filed on Jun. 5, 2015.

(51) Int. Cl.
*H04W 76/20* (2018.01)
*H04W 76/27* (2018.01)
(Continued)

(52) U.S. Cl.
CPC ....... *H04W 36/0088* (2013.01); *H04W 24/10* (2013.01); *H04W 28/0247* (2013.01);
(Continued)

(58) Field of Classification Search
CPC ............. H04J 1/16; H04B 17/00; H04W 4/00
(Continued)

(56) References Cited

U.S. PATENT DOCUMENTS 8,743,723 B2 *  6/2014  Watfa ................ H04W 72/1289
                                                                      370/252
9,100,883 B2 *  8/2015  Bontu ............... H04W 36/0083
(Continued)

FOREIGN PATENT DOCUMENTS

WO      2010098634 A2    9/2010
WO      2012108657 A2    8/2012
(Continued)

*Primary Examiner* — Iqbal Zaidi
(74) *Attorney, Agent, or Firm* — Dentons US LLP

(57) ABSTRACT

The present invention relates to a wireless communication system. More specifically, the present invention relates to a method for transmitting data by a terminal in a wireless communication system supporting high-speed uplink transmission, the method comprising the steps of: transmitting or receiving a signal to or from a serving cell by a terminal in a state where the terminal is in radio resource control (RRC) connection with the serving cell; performing measurements for the serving cell and a neighboring cell; and transmitting data to the neighboring cell on the basis of the measurements in a state where RRC connection with the serving cell is established.

12 Claims, 12 Drawing Sheets

(51) Int. Cl.
*H04W 76/28* (2018.01)
*H04W 24/10* (2009.01)
*H04W 28/02* (2009.01)
*H04W 36/00* (2009.01)
*H04W 40/12* (2009.01)
*H04W 36/30* (2009.01)
*H04W 40/24* (2009.01)

(52) U.S. Cl.
CPC ....... *H04W 28/0252* (2013.01); *H04W 40/12* (2013.01); *H04W 40/24* (2013.01); *H04W 76/20* (2018.02); *H04W 36/0077* (2013.01); *H04W 36/00837* (2018.08); *H04W 36/30* (2013.01); *H04W 76/27* (2018.02); *H04W 76/28* (2018.02); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/23* (2018.01); *Y02D 70/24* (2018.01); *Y02D 70/34* (2018.01)

(58) Field of Classification Search
USPC .......................... 370/252–339; 455/436, 439
See application file for complete search history.

(56) References Cited

U.S. PATENT DOCUMENTS

2014/0301360 A1    10/2014   Bontu et al.
2016/0352629 A1*   12/2016   Wang .................... H04L 45/306

FOREIGN PATENT DOCUMENTS

WO      2012111984  A2    8/2012
WO      2014098393  A1    6/2014

* cited by examiner

FIG. 3
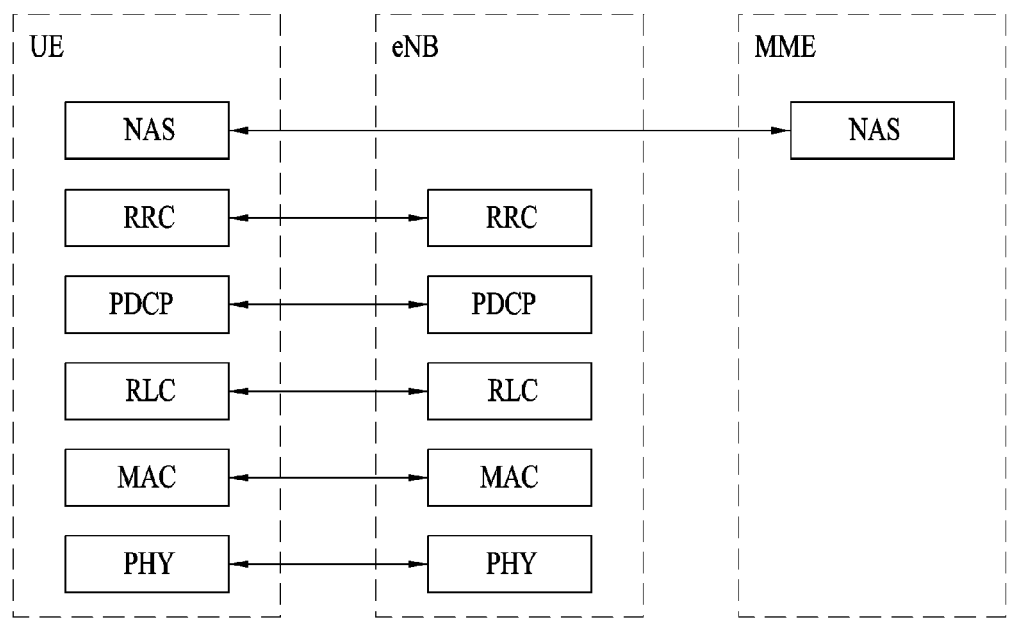
(a) control-plane protocol stack
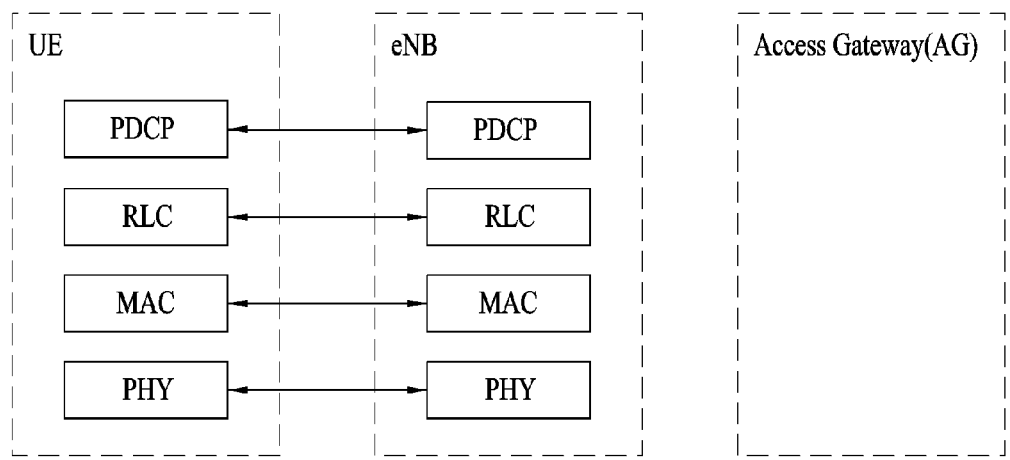
(b) user - plane protocol stack

METHOD FOR TRANSMITTING DATA BY TERMINAL IN WIRELESS COMMUNICATION SYSTEM SUPPORTING HIGH-SPEED UPLINK, AND APPARATUS FOR SAME

This application is a 35 USC § 371 National Stage entry of International Application No. PCT/KR2016/005980 filed on Jun. 7, 2016, and claims priority to U.S. Provisional Application Nos. 62/171,250 filed on Jun. 5, 2015 and 62/387,498 filed on Dec. 24, 2015, all of which are hereby incorporated by reference in their entireties as if fully set forth herein.

TECHNICAL FIELD

The present invention relates to a wireless communication system, and more particularly, to a method for transmitting data by a user equipment (UE) in a wireless communication system supporting high-speed uplink and an apparatus for the same.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

Based on the aforementioned discussion, an object of the present invention is to suggest a method for transmitting data by a user equipment (UE) in a wireless communication system supporting high-speed uplink and an apparatus for the same.

Technical Solution

In one aspect of the present invention, a method for transmitting data by a user equipment (UE) in a wireless communication system supporting high-speed uplink transmission comprises the steps of transmitting or receiving a signal to or from a serving cell by the UE of a radio resource control (RRC) connected state with the serving cell; performing measurements for the serving cell and a neighboring cell; and transmitting data to the neighboring cell based on measurement values in the RRC connected state with the serving cell.

Preferably, the step of transmitting data to the neighboring cell is performed while a timer T310, T311 or T301 is running. In this case, the transmitting data to the neighboring cell may be performed if the timer is stopped or expires.

Alternatively, the transmitting data to the neighboring cell may be performed if a measurement value of the serving cell is a specific threshold value or less.

Meanwhile, the UE may further receive information on the neighboring cell from the serving cell. Preferably, information on the neighboring cell may include at least one of information indicating whether uplink transmission is granted, a resource for transmission to the neighboring cell, or a transmission parameter for transmission to the neighboring cell.

The neighboring cell may be a cell that satisfies the following conditions.

A measurement value of the neighboring cell may be greater than that of the serving cell.

Alternatively, a sum of a measurement value of the neighboring cell and an offset value of the neighboring cell may be greater than the measurement value of the serving cell.

Also, the neighboring cell may have a greatest measurement value among a plurality of neighboring cells.

In this case, a measurement value may be a reference signal received power (RSRP) or reference signal received quality (RSRQ) value.

Meanwhile, the data may correspond to a service mapped into a specific bearer.

The data may be transmitted to the neighboring cell without reception of an uplink grant from the neighboring cell.

In another aspect of the present invention, a user equipment (UE) in a wireless communication system supporting high-speed uplink transmission comprises a transceiver for transmitting or receiving a signal to or from a serving cell or neighboring cell; and a processor connected to the transceiver, wherein the processor may be configured to transmit or receive the signal to and from the serving cell in a radio resource control (RRC) connected state with the serving cell, perform measurements for the serving cell and the neighboring cell, and transmit data to the neighboring cell based on measurement values in the RRC connected state with the serving cell.

Advantageous Effects

According to the embodiment of the present invention, a UE may efficiently transmit an urgent signal or a signal, which requires quick transmission, to a network in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

FIG. 3 is a diagram structures of a control plane and a user plane of a radio interface protocol between a UE and an E-UTRAN based on the 3GPP radio access network specification;

BEST MODE FOR CARRYING OUT THE INVENTION

Figure 1:
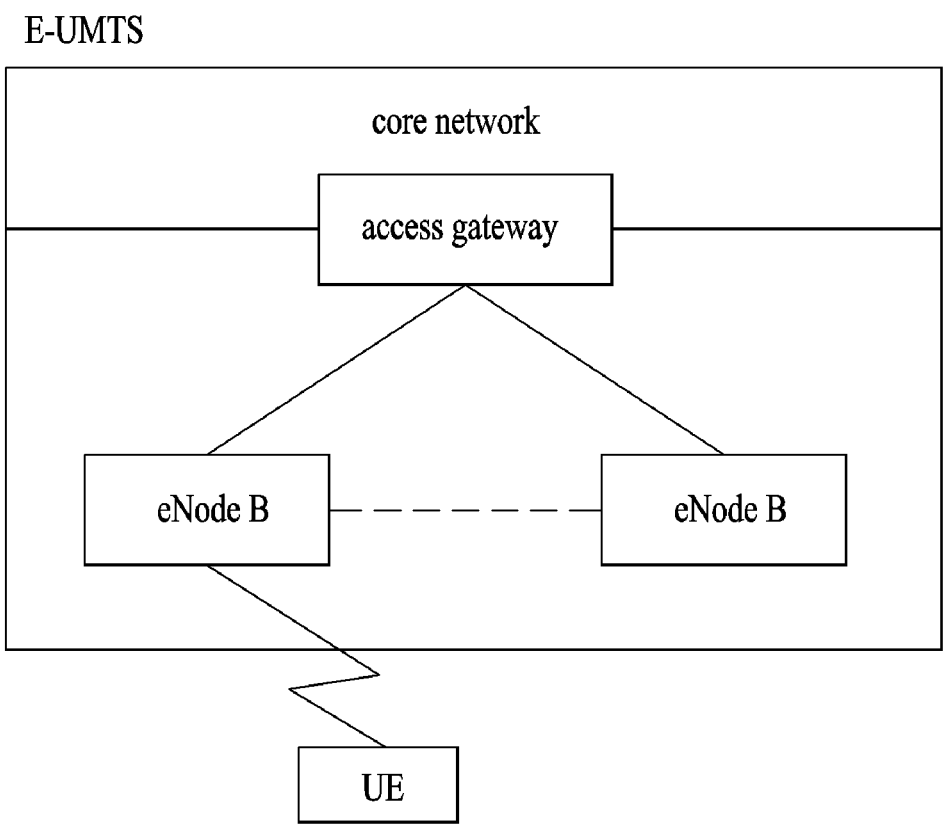
FIG. 1 is a diagram briefly illustrating a network structure of an E-UMTS as an example of a wireless communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Wherever possible, the same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a receiving device. In other words, the transmission device attempts to detect presence of a carrier from another transmission device before attempting to perform transmission. Upon sensing the carrier, the transmission device waits for another transmission device which is performing transmission to finish transmission, before performing transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

Figure 2:
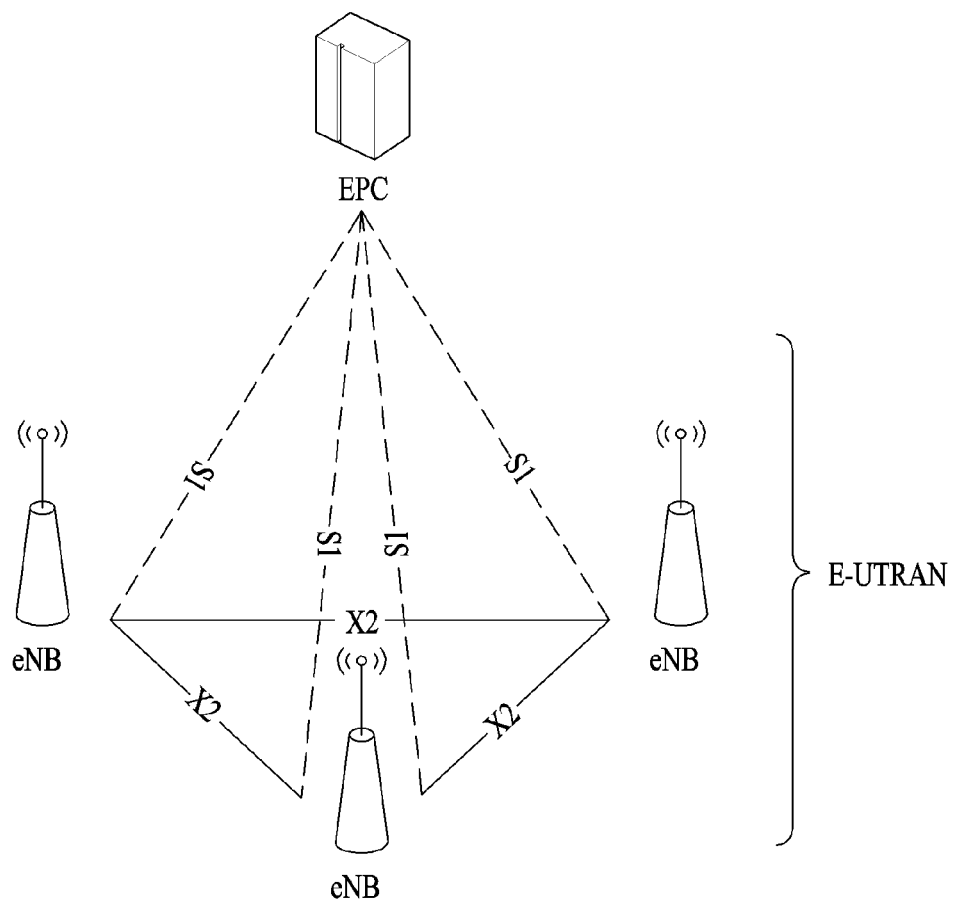
FIG. 2 is a diagram conceptually illustrating a network structure of an E-UTRAN (Evolved Universal Terrestrial Radio Access Network).

FIG. 2 is a diagram conceptually illustrating a network structure of an E-UTRAN (Evolved Universal Terrestrial Radio Access Network). In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

FIG. 3 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.25, 2.5, 5, 10, 15 and 20 MHz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH).

Meanwhile, UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 4:
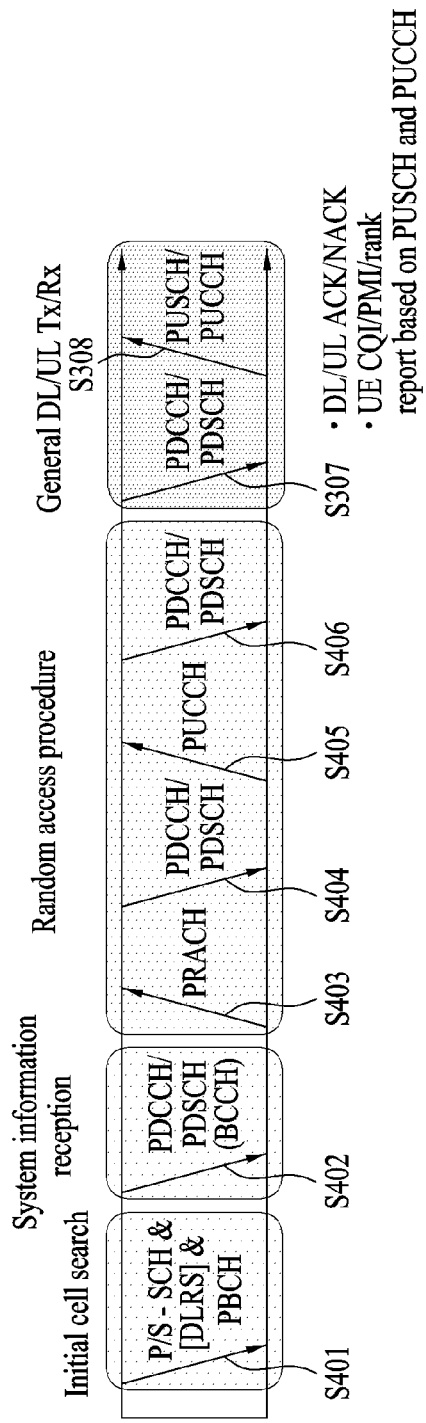
FIG. 4 is a diagram illustrating physical channels used in a 3GPP system and a general signal transmission method using the same.

FIG. 4 illustrates physical channels used in 3GPP and a general method for transmitting signals on the physical channels.

When a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 5:
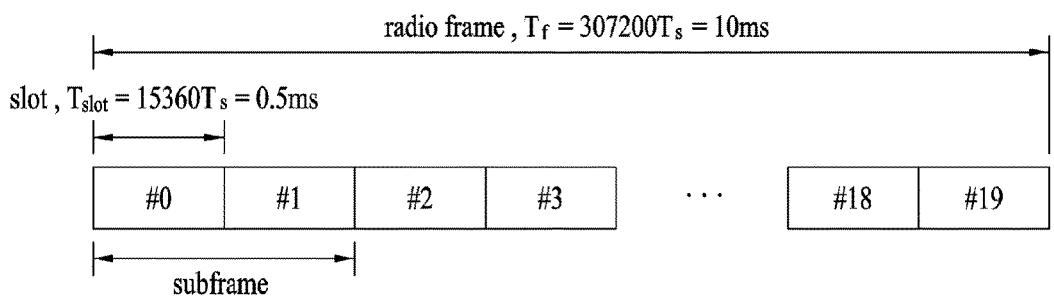
FIG. 5 is a diagram illustrating the structure of a radio frame used in an LTE system.

FIG. 5 is a diagram for a structure of a radio frame in an LTE system.

Referring to FIG. 5, the radio frame has a length of 10 ms ($327200 \times T_S$) and includes 10 subframes of an equal size. Each of the subframes has a length of 1 ms and includes two slots. Each of the slots has a length of 0.5 ms ($15360 \times T_S$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is only exemplary. And, the number of subframes included in a radio frame, the number of slots included in a subframe and the number of OFDM symbols included in a slot may be modified in various ways.

Figure 6:
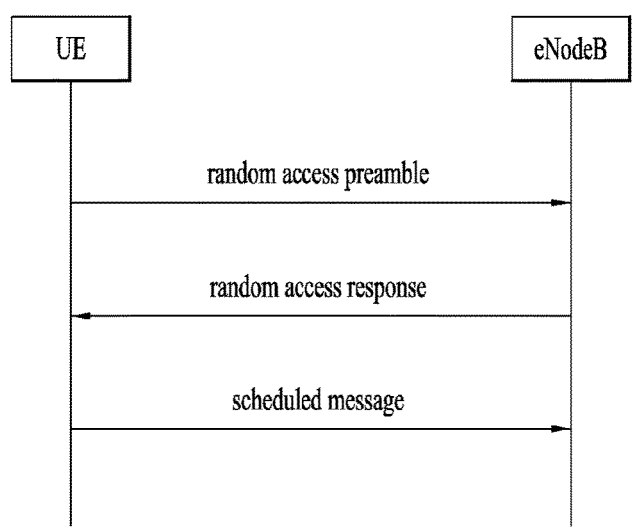
FIG. 6 is a diagram illustrating a random access procedure.

Next, a random access procedure will be described. The random access procedure is also called RACH (random access channel) procedure. The random access procedure is used for initial access, uplink synchronization adjustment, resource allocation, handover, etc. The random access procedure is classified into a contention-based process and a dedicated (i.e., non-contention-based) process. The contention-based random access procedure includes initial access and is normally used, whereas the dedicated random access procedure is limitedly used for handover. In the contention-based random access procedure, a UE randomly selects a RACH preamble sequence. Therefore, a plurality of UEs can simultaneously transmit the same RACH preamble sequence and thus a contention resolution procedure is needed. On the other hand, in the dedicated random access procedure, a UE uses a RACH preamble sequence uniquely allocated thereto by a BS. Therefore, the UE can perform the random access procedure without colliding with other UEs. FIG. 6 is a flow chart illustrating an example of a random access procedure in the 3GPP LTE.

The contention-based random access procedure is mainly illustrated in FIG. 6. However, the random access procedure in the present invention may correspond to the dedicated random access procedure as well as the contention-based random access procedure.

Referring to FIG. 6, the contention-based random access procedure includes the following four steps (step 4 is not shown). Hereinafter, messages transmitted in steps 1 to 4 may be referred to as Msg 1 to Msg 4, respectively.

Step 1: RACH preamble (via PRACH) (UE to BS)
Step 2: Random access response (RAR) (via PDCCH and PDSCH) (BS to UE)
Step 3: Layer 2/Layer 3 message (via PUSCH) (UE to BS)
Step 4: Contention resolution message (BS to UE)

Meanwhile, the dedicated random access procedure includes the following three steps. Hereinafter, messages transmitted in steps 0 to 2 may be referred to as Msg 0 to Msg 2, respectively. Uplink transmission (i.e., step 3) corresponding to a RAR may be performed as a part of the random access procedure. The dedicated random access procedure may be triggered using a PDCCH (hereinafter, referred to as PDCCH order) used for a BS to command RACH preamble transmission.

Step 0: PACH preamble allocation through dedicated signaling (BS to UE)
Step 1: RACH preamble (via PRACH) (UE to BS)
Step 2: RAR (via PDCCH and PDSCH) (BS to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE may perform UL transmission (e.g., Msg3) in accordance with resource allocation information and TA value in the RAR. HARQ is applied to UL transmission corresponding to the RAR. Therefore, the UE may receive acknowledgement information (e.g., PHICH) corresponding to Msg 3 after transmission of Msg 3.

The random access procedure is used by a UE to obtain UL synchronization with a BS or be allocated with UL radio resource.

The UE receives root index and PRACH (physical random access channel) configuration index from eNodeB. 64 candidate random access preambles defined by ZC (Zadoff-Chu) sequence exist per cell, and the root index is a logic index for generating 64 candidate random access preambles in the UE.

Transmission of the random access preambles is limited to specific time and frequency resources per cell. The PRACH configuration index indicates a specific subframe for enabling random access preamble transmission and a preamble format.

The UE transmits a randomly selected random access preamble to the eNodeB. The UE selects one of the 64 candidate random access preambles. And, the UE selects a corresponding subframe by means of the PRACH configuration index. The UE transmits the selected random access preamble from the selected subframe.

The eNodeB that has received the random access preamble transmits a random access response (RAR) to the UE. The random access response is detected by two steps. First of all, the UE detects a PDCCH masked with RA-RNTI (random access-RNTI) and receives a random access response a MAC (Medium Access Control) PDU (Protocol Data Unit) on a PDSCH indicated by the detected PDCCH.

Hereinafter, RRC state of the UE and RRC connection method will be described.

The RRC state means whether an entity of RRC layer of the UE is logically connected with an entity of RRC layer of the eNodeB. If the entity of the RRC layer of the UE is logically connected with the entity of the RRC layer of the eNodeB, it may be referred to as RRC connected state. If not so, it may be referred to as RRC idle state.

Since the E-UTRAN may identify the presence of the UE which is in the RRC connected state, on the basis of cell unit, the E-UTRAN may effectively control the UE. On the other hand, the E-UTRAN may not identify the UE which is in the RRC idle state, on the basis of cell unit. In this case, the UE is managed by the core network (CN) on the basis of tracking area (TA) unit which is a local unit greater than the cell unit. The tracking area is a unit of a set of cells. In other words, the presence of the UE of the idle state is only identified on the basis of a great local unit, and in order that the UE which is in the RRC idle state receives a mobile communication service such as voice or data from the cell, the UE should be shifted to the connected state.

When a user initially turns on the power of the UE, the UE attempts to make access with a PLMN (Public Land Mobile Network). The accessed specific PLMN may be selected automatically or manually. In this case, the PLMN means a wireless communication system for use by means of a user who is in a car or is walking on the ground. Alternatively, the PLMN may indicate all mobile wireless networks which use terrestrial based BS in addition to satellite based BS. The UE searches for a proper cell of the selected PLMN and then stays in the corresponding cell in RRC idle state. The UE of the RRC idle state selects a cell that may provide available services (cell selection) and is adjusted to be matched with a control channel of the selected cell. That is, the UE camps on the cell. The UE monitors a paging signal and system information transmitted from the PLMN on the camp-on cell. Also, the UE may first access a network through the control channel of the cell, and may receive a broadcasting message of the cell.

The UE maintained in the idle state establishes RRC connection with the RRC layer of the eNode B through an RRC connection procedure when the RRC connection is required, and then is shifted to the RRC connected state.

In this case, there are several cases where the UE of the idle state needs RRC connection, and for example, may include a case where calling attempt or uplink data transmission of a user is required or a case where a response message to a paging message received from the E-UTRAN should be transmitted.

Figure 7:
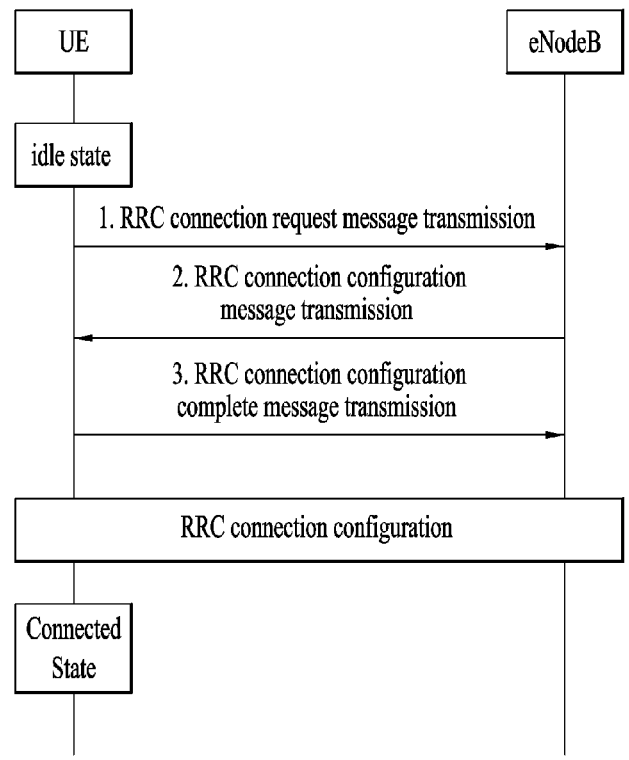
FIG. 7 is a flow chart illustrating RRC connection procedure.

In order that the UE of the idle state establishes RRC connection with the eNodeB, the UE should perform RRC connection procedure as described above. The RRC connection procedure includes a procedure of transmitting RRC connection request message from the UE to the eNodeB, a procedure of transmitting RRC connection setup message from the UE to the eNodeB, and a procedure of transmitting RRC connection setup complete message from the UE to the eNodeB. These procedures will be described in more detail with reference to FIG. 7.

1) If the UE of the idle state desires to establish RRC connection due to calling attempt, data transmission attempt, or a response to paging of the eNodeB, the UE transmits the RRC connection request message to the eNodeB.

2) If the RRC connection request message is received from the UE, the eNB accepts the RRC connection request of the UE if there are sufficient radio resources, and transmits the RRC connection setup message, which is a response message, to the UE.

3) If the UE receives the RRC connection setup message, the UE transmits the RRC connection setup complete message to the eNodeB. If the UE successfully transmits the RRC connection setup message, the UE establishes RRC connection with the eNodeB and is shifted to RRC connected mode.

Meanwhile, if the UE cannot perform normal communication due to deterioration of radio channel quality or setup mismatching between the UE and the network, the UE determines that there is a failure in a current communication link and starts RRC connection reestablishment procedure.

In the 3GPP standard document TS 36.331, as examples that normal communication cannot be performed, there are a case that the UE determines that there is a serious problem in downlink communication link quality on the basis of radio quality measurement result of a physical layer of the UE, a case that the UE determines that a random access procedure in a MAC sublayer is continuously failed or there is a serious problem in uplink transmission due to continuous failure of uplink data transmission in the RLC sublayer, a case that handover has been failed, or a case that a message received by the UE fails to pass integrity check.

Figure 8:
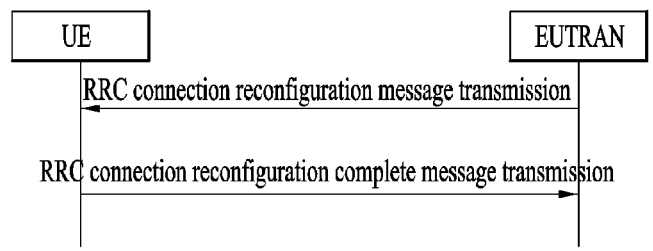
FIG. 8 is a flow chart illustrating RRC re-connection procedure.

FIG. 8 is a flow chart illustrating RRC re-connection procedure.

The UE stops usage of all radio bearers, which are configured, except SRB 0 (Signaling Radio Bearer #0), initiates various sublayers of AS (Access Stratum), and configures each sublayer and physical layer as a default configuration. In this case, it is important that the UE maintains RRC connected state.

Also, the UE performs a cell selection procedure for performing RRC connection re-configuration procedure. The cell selection procedure of the conventional RRC connection reconfiguration procedure is identical to the cell selection procedure performed by the UE in RRC idle state even though the UE maintains RRC connected state.

If it is determined that the cell selected through the cell selection procedure for performing RRC connection reconfiguration procedure uses E-UTRA, the UE transmits RRC connection reconfiguration grant message to the corresponding cell if the cell grants RRC connection reconfiguration request message of the UE.

If the UE receives RRC connection reconfiguration grant message, the UE reconfigures a PDCP sublayer and RLC sublayer for SRB 1. Also, the UE again calculates various key values related to security configuration, and reconfigures a PDCP sublayer, which is in charge of security, as newly calculated security key values. As a result, SRB 1 is opened between the UE and the cell, and RRC control message may be transmitted and received therebetween. The UE completely resumes SRB 1 and transmits a confirmation message indicating that RRC connection reconfiguration procedure has been completed, to the cell.

Therefore, if the RRC connection reconfiguration procedure is successfully performed, the cell performs RRC connection reconfiguration procedure with the UE and thus restores to the state before the UE performs the RRC connection reconfiguration procedure and ensures continuity of service to the maximum.

Meanwhile, if it is determined that the cell selected through the cell selection procedure for performing the RRC connection reconfiguration procedure is a cell which uses another RAT in addition to E-UTRAN, the RRC connection reconfiguration procedure is stopped, and the UE enters the RRC idle state. Also, even in the case that the UE fails in cell selection within a limited time, the UE assumes that the RRC connection reconfiguration procedure has been failed and enters the RRC idle state.

Meanwhile, if the cell rejects RRC connection reconfiguration request message of the UE, the cell transmits RRC connection reconfiguration rejection message to the UE. If the UE receives the RRC connection reconfiguration rejection message, the UE releases the RRC connected state and is shifted to the RRC idle state.

Hereinafter, the cell selection and cell re-selection procedure will be described.

Services provided to the UE by the network may be classified into three types. The UE recognizes types of cells differently depending on which service may be provided thereto. That is, the cell on which the UE of the idle state camps may be classified differently depending on serve types. In the 3GPP standard document, the services provided to the UE by the network are classified into three types as listed in Table 1 below.

TABLE 1

| Limited service | provides emergency call and ETWS (Earthquake and Tsunami Warning System). |
| Normal service | provides service for public use. |
| Operator service | provides service for communication network operator |

Also, in the 3GPP standard document, types of cells are classified as follows in respect of service types provided to the UE by cells.

TABLE 2

| Acceptable cell | Cell that may provide UE with limited service |
| Suitable cell | Cell that may provide UE with normal service |
| Barred cell | Cell designated as barred cell in system information |
| Reserved cell | Cell designated as reserved cell in system information |

In this case, the Acceptable cell is a cell that satisfies cell selection criteria of the UE without being barred in view of the UE, and may be provided with only a limited service such as emergency call and ETWS. The limited service is a service type that may be supported by the acceptable cell.

Also, the suitable cell satisfies the condition of the acceptable cell, and at the same times satisfies additional conditions. As additional conditions, the corresponding cell should belong to PLMN that may be accessed by the corresponding UE, and should be a cell in which TA update procedure of the UE is not barred. If the corresponding cell is a closed subscriber group (CSG) cell, the corresponding cell should be a cell to which the UE should access as a CSG member. Meanwhile, the operator service is a service acceptable to a specific UE by means of a service operator, and may be supported for a reserved cell.

The UE performs the cell selection procedure to receive a service from the cell, and registers itself in a network. Also, if signal strength or signal quality between the UE and the cell is deteriorated, the UE performs a cell re-selection procedure to maintain transmission quality of data.

In the 3GPP standard document, the cell selection may be classified into the following two types.

The first type is an initial cell selection procedure, and is performed when the UE does not have prior information on a radio channel. In this case, the UE searches for radio channels to discover a proper cell, and selects a cell corresponding to a radio channel having the strongest signal quality among the searched radio channels.

The second type is a stored information cell selection procedure, and is performed when the UE already stores information on a radio channel therein. In this case, since the UE already has information on a radio channel, the cell may be selected more quickly than the aforementioned initial cell selection procedure.

The following Equation 1 indicates a cell selection reference in the LTE system disclosed in the 3GPP standard document.

$$\text{Srxlev} = \text{Qrxlevmeas} - (\text{Qrxlevmin} + \text{Qrxlevminoffset}) - \text{Pcompensation} > 0 \qquad \text{<Equation 1>}$$

Parameters used in the Equation 1 are as listed in Table 3.

TABLE 3

| | |
|---|---|
| $Q_{rxlevmeas}$ | Received level (RSRP) of received cell |
| $Q_{rxlevmin}$ | Minimum required received level (dBm) in cell |
| $Q_{rxlevminoffset}$ | Offset for $Q_{rxlevmin}$ |
| Pcompensation | $\max(P_{EMAX} - P_{UMAX}, 0)$ (dB) |
| $P_{EMAX}$ | Maximum transmission power (dBm) of UE to corresponding cell |
| $P_{UMAX}$ | Maximum transmission power (dBm) of radio frequency (RF) unit of UE |

The UE receives the parameters of Table 3 through System Information (SI), and performs a cell selection procedure by using the cell selection reference of the Equation 1.

Meanwhile, the aforementioned system information includes essential information that should be known by the UE to access the cell. Therefore, the UE should have the latest system information before accessing the cell. Since the system information should be known by all UEs within one cell, the cell transmits the system information periodically.

The system information is categorized into MIB (Master Information Block), SB (Scheduling Block), and SIB (System Information Block). The MIB allows the UE to know a physical configuration of a corresponding cell, for example, bandwidth information. The SIB is a set of related system information. For example, one SIB includes only information on a neighboring cell, and another SIB includes only information on an uplink radio channel used by the UE. The SB notifies transmission information of the SIBs, for example, transmission cycle.

Meanwhile, after the UE selects a random cell through the cell selection procedure, signal strength or quality between the UE and the cell may be changed by mobility of the UE or change of a radio environment. If quality of the selected cell is deteriorated, the UE may select another cell that provides better quality. In this way, if the UE selects a cell again, the UE selects a cell that provides better signal quality than that of the currently selected cell. This will be referred to as a cell reselection procedure.

The cell reselection procedure is basically intended to select a cell that provides the best cell to the UE in view of quality of a radio signal. In addition to quality of the radio signal, the network may determine a priority per frequency and notify the UE of the determined priority. The UE which has received the priority first considers the priority prior to the radio signal quality reference. The cell reselection procedure may be classified as listed in Table 4 below in accordance with radio access technology (RAT) and frequency characteristics of the cell.

TABLE 4

| | |
|---|---|
| Intra-frequency cell reselection | Reselection of cell having the same RAT and the same center-frequency as those of serving cell |
| Inter-frequency cell reselection | Reselection of cell having the same RAT as that of serving cell and center-frequency different from that of serving cell |
| Inter-RAT cell reselection | Reselection of cell which uses RAT different from that used by serving cell |

Figure 9:
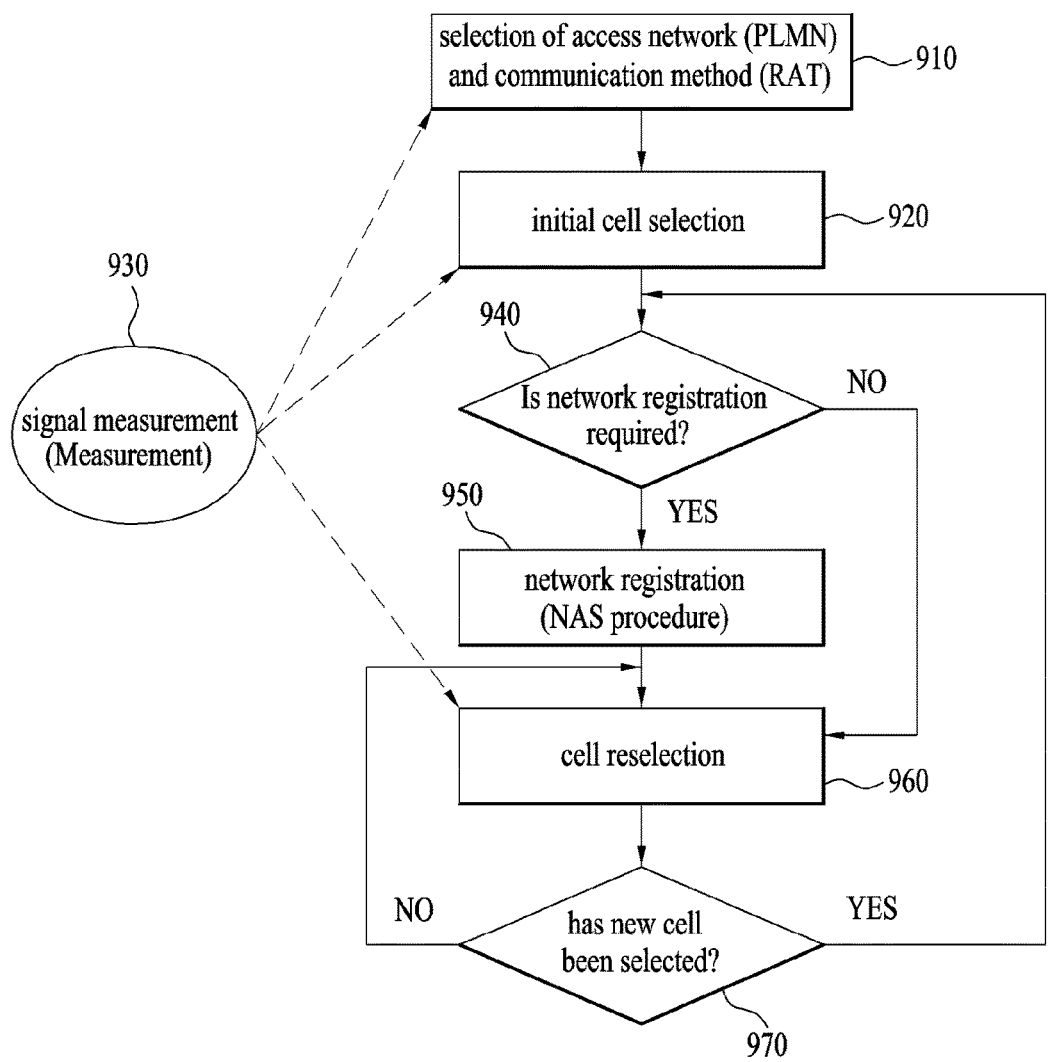
FIG. 9 is a flow chart illustrating an operation of a UE when the UE turns on a power in an LTE system.

FIG. 9 is a flow chart illustrating an operation of a UE when the UE turns on a power in an LTE system.

Referring to FIG. 9, in step S910, the UE automatically or manually selects a PLMN (Public Land Mobile Network) through which desires to receive a service and RAT (Radio Access Technology) for communication. PLMN and RAT information may be selected by a user of the UE, or information stored in a Universal Subscriber Identity Module (USIM) may be used. In this case, the UE measures a signal periodically or non-periodically transmitted from the cell, that is, reference signal or pilot signal in step S930 and obtains cell quality information by using characteristics of a physical signal related to signal strength or signal and noise/interference ratio.

Afterwards, in step S920, the UE performs a cell selection procedure for selecting a cell having the largest value among cells of which cell quality information measured by the UE is greater than a reference value. The reference value means a value defined in the system to make sure of quality of a physical signal in data transmission and reception. Therefore, the value may be varied depending on RAT which is applied, and may depend on the Equation 1 in the LTE system.

Afterwards, the UE receives system information periodically transmitted from the cell, and registers its information (e.g., International Mobile Subscriber Identity, IMSI) in a network to receive a service from the network by using the received system information in step S950. The UE does not always register its information in the network whenever selecting a cell, and registers its information in the network when information (e.g., Tracking Area Identity, TAI) of the network, which is received from SI, is different from information of the network, which is known by itself in steps S940 and S970.

Also, in step S960, the UE reselects one of different cells that provide better signal characteristic than that of a cell accessed by the UE of strength or quality of a signal measured from a serving cell is lower than that measured from a neighboring cell. This procedure will be referred to as a cell reselection identified from cell selection of the step S920. At this time, a temporal restriction condition (e.g., cell selection timer) may be set to prevent a cell from being frequently reselected in accordance with a change of signal characteristic.

Hereinafter, measurement and measurement report will be described.

In a mobile communication system, mobility of the UE is necessarily supported. Therefore, the UE continuously measures quality of a serving cell that currently provides a service and quality of a neighboring cell. The UE reports the measured result to the network at a proper time, and the network provides the UE with optimal mobility through handover, etc.

Measurement report is performed for one or more methods (handover, random access, cell search, etc.) for securing mobility of the UE. Since the measurement report requires coherent demodulation in some degree, the measurement report may be performed after a synchronization parameter and a physical layer parameter are obtained by a UE except reception signal strength measurement. The measurement report may include RRM measurement including RSRP (reference signal receive power), RSSI (received signal strength indicator), RSRQ (reference signal received quality), etc. for measuring signal strength of a serving cell and a neighboring cell or signal strength compared to total reception power and RLM measurement capable of evaluating whether or not a radio link failure is generated by measuring link quality with a serving cell.

The RSRP is a liner average of power distribution of an RE to which a CRS is transmitted in downlink.

The RSSI is a linear average of total reception power received by a corresponding UE, and the RSSI is measured for an OFDM symbol including an RS for an antenna port 0, and is a measurement value including interference, noise power, and the like from neighboring cells. If higher layer signaling indicates a specific subframe to measure the RSRQ, the RSSI is measured for all OFDM symbols included in the indicated specific subframe.

The RSRQ is a value measured in the form of N*RSRP/RSSI. In this case, the N corresponds to the number of RBs of a corresponding bandwidth at the time of measuring the RSSI.

Transmission of measurement report may be determined by event based measurement report determination as follows.

i) The case that a measurement value of the serving cell is greater than an absolute threshold value (Serving cell becomes better than absolute threshold), ii) The case that a measurement value of the serving cell is smaller than an absolute threshold value (Serving cell becomes worse than absolute threshold), iii) The case that a measurement value of a neighboring cell becomes greater as much as an offset value than the measurement value of the serving cell (Neighboring cell becomes better than an offset relative to the serving cell), iv) The case that a measurement value of a neighboring cell becomes greater than an absolute threshold value (Neighboring cell becomes better than absolute threshold), and v) The case that a measurement value of the serving cell becomes smaller than an absolute threshold value and a measurement value of a neighboring cell becomes greater than another threshold value (Serving cell becomes worse than one absolute threshold and Neighboring cell becomes better than another absolute threshold).

In this case, the measurement value may be the aforementioned RSRP.

Also, measurement report may be configured to be transmitted only if respective conditions of the aforementioned measurement report determination are maintained for a predetermined time or more set by the network.

Measurement report is basically performed using CRS. Measurement report related to description of the present invention may be used by any one of CSI-RS and DMRS including CRS, or selective combination. Also, measurement report may be performed for specific antenna port(s) of antenna ports to which a reference signal is transmitted, or reference signal configuration. (For example, in case of CSI-RS, reference signal configuration may be performed such that a plurality of reference signals may be allocated for the same subframe, and each reference signal configuration may include CSI-RS of port 2, 4 or 8, and transmission may be performed at different transmission timings).

If measurement report is performed using CSI-RS, the CSI-RS may be used even for measurement of a neighboring cell (adjacent cell, transmission point having no separate cell ID, cell/transmission point included in CoMP set). To this end, the BS may notify the UE of CSI-RS configuration used by the neighboring cell for CoMP and/or interference measurement, and the UE may perform measurement for CSI-RS transmitted by CSI-RS configuration (indicated by the BS) among CSI-RS configurations of the neighboring cell. Also, signal strength of a plurality of cells may be measured through signaling (a plurality of CSI-RS configurations) of CSI-RS configurations of several cells including the serving cell. However, if the serving cell is not aligned with timing (for example, subframe boundary) of the neighboring cell, measurement cannot be performed exactly. In this case, for exact measurement, there is a method for performing synchronization (or tracking) for a corresponding neighboring cell (or, CSI-RS configuration). However, this additional synchronization has a problem in that complexity may be increased and affect communication with the serving cell.

Hereinafter, a handover procedure of the UE will be described.

Figure 10:
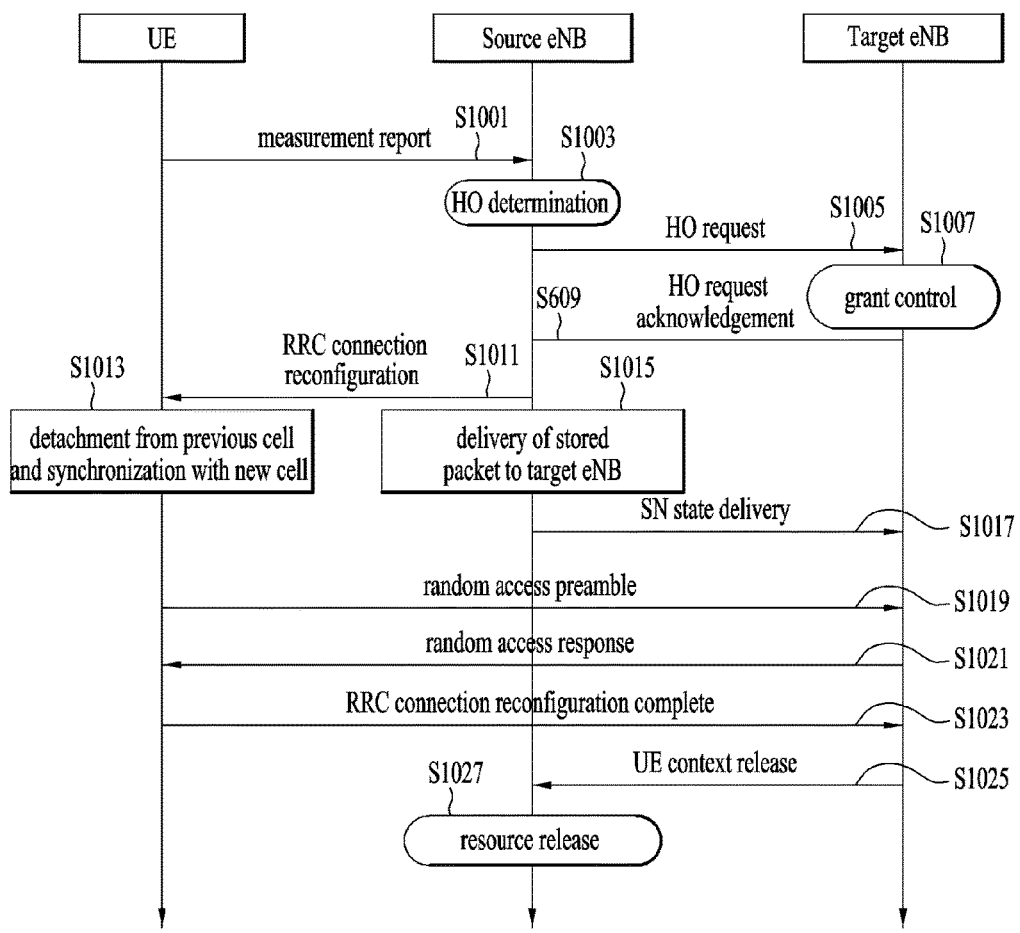
FIG. 10 is a diagram illustrating an example of a connection mode handover procedure in an LTE system.

FIG. 10 is a diagram illustrating an example of a connection mode handover procedure in an LTE system.

In FIG. 10, the network system may include a UE, a source BS (source eNB) and a target BS (target eNB). At this time, the source BS is a serving BS that provides a UE with a scheduling service, and the target BS is a target BS for which a UE desires to perform handover. Also, the source BS and the target BS may be a legacy BS and a macro BS.

The network controls a UE of RRC_CONNECTED state, and a handover procedure for managing mobility of the RRC_CONNECTED state is defined. Generally, the network triggers the handover procedure in accordance with a radio channel condition and load. This handover procedure is shown in FIG. 10.

Referring to FIG. 10, the UE transmits a measurement report message, which includes a measurement result of a neighboring cell, to the source BS (S1001).

The source BS may determine whether to perform handover and determine a target BS for which the UE may perform handover. Afterwards, the source BS may transmit a handover request message to the target BS to perform handover (S1003, S1005).

The target BS controls a grant of the UE, and if the UE is granted, the target BS transmits HO request acknowledge message to the serving BS (S1007, S1009).

The source BS that has received the HO request acknowledge message transmits RRC connection reconfiguration message to the UE to command the UE to perform HO procedure (S1011).

The UE that has received the RRC connection reconfiguration message may be detached from the existing cell (that is, source BS), and may perform a procedure of synchronizing with a new cell (that is, target BS) (S1013).

Since the source BS knows that the UE will perform handover to a random target BS, the source BS delivers a stored packet to the UE (S1015).

The source BS transmits a sequence number (SN) state delivery message to the target BS to deliver buffered data or packet to the target BS (S1017).

Afterwards, the UE transmits a random access preamble to synchronize with the target BS (S1019).

The target BS transmits uplink resource allocation information and timing advance (TA) information to the UE through a MAC (Medium Access Control) message or RRC message in response to a random access preamble (S1021).

The UE transmits RRC connection reconfiguration complete message to the target BS on the basis of uplink resource allocation information and TA information (S1023).

If the target BS receives the RRC connection reconfiguration complete message from the UE, the target BS transmits a UE context release message for requesting removal of information related to the UE (S1025).

The serving BS that has received the UE context release message releases a resource for the UE and completes the handover procedure (S1027).

As described above, FIG. 10 illustrates a legacy handover procedure performed by the UE. That is, whenever the BS that provides a scheduling service to the UE is changed, the UE may perform the handover procedure shown in FIG. 10.

Meanwhile, the UE performs RLM (Radio Link Monitoring) and RRM (Radio Resource Management) operation to measure/report/manage a radio link status and received signal quality. An operation such as RRC connection reestablishment, handover, cell reselection and cell measurement may be accompanied by UE in accordance with RLM/RRM.

In case of RLM, the UE may monitor downlink radio link quality of a serving cell (e.g., primary cell, Pcell) on the basis of a CRS. In more detail, the UE may estimate radio link quality at a single subframe on the basis of the CRS, and may monitor/assess a radio link status (e.g., out-of-sync or in-sync) by comparing the estimated value (e.g., SNR (Signal to Noise Ratio) or SINR (Signal to Interference and Noise Ratio) with threshold values Qout and Qin. If the radio link status corresponds to in-sync, the UE may normally perform/maintain communication with the BS, and if the radio link status corresponds to out-of-sync, the UE may regard that radio link has been failed and perform an operation such as RRC connection re-establishment, handover, cell reselection and cell measurement. The threshold value Qout is defined as a level that a downlink radio link cannot be received reliably, and corresponds to BLER (Block Error Rate) 10% of hypothetical PDCCH transmission when a PCFICH error is considered in a state that parameters of Table 5 are assumed. The threshold value Qin is defined as a level that a downlink radio link can be received meaningfully and reliably, and corresponds to PDCCH BLER 2% of hypothetical PDCCH transmission when a PCFICH error is considered in a state that parameters of Table 6 are assumed. Subframe(s) for which RLM is performed may be restricted through higher layer (e.g., RRC) signaling.

Table 5 illustrates PDCCH/PCFICH transmission parameters of out-of-sync, and Table 6 illustrates PDCCH/PCFICH transmission parameters of in-sync.

TABLE 5

| Attribute | Value |
| --- | --- |
| DCI format | 1A |
| Number of control OFDM symbols | 2; Bandwidth ≥10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥3 MHz |
| Ratio of PDCCH RE energy to average RS RE energy | 4 dB; when single antenna port is used for cell-specific reference signal transmission by the PCell. |

TABLE 5-continued

| Attribute | Value |
| --- | --- |
| | 1 dB: when two or four antenna ports are used for cell-specific reference signal transmission by the PCell. |
| Ratio of PCFICH RE energy to average RS RE energy | 4 dB: when single antenna port is used for cell-specific reference signal transmission by the PCell.<br>1 dB: when two or four antenna ports are used for cell-specific reference signal transmission by the PCell. |

Note 1:
DCI format 1A.
Note 2:
A hypothetical PCFICH transmission corresponding to the number of control symbols shall be assumed.

TABLE 6

| Attribute | Value |
| --- | --- |
| DCI format | 1C |
| Number of control OFDM symbols | 2; Bandwidth ≥10 MHz<br>3; 3 MHz ≤ Bandwidth ≤ 10 MHz<br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1C.
Note 2:
A hypothetical PCFICH transmission corresponding to the number of control symbols shall be assumed.

A physical layer of the UE monitors downlink radio link quality of a serving cell (e.g., PCell) and notifies a higher layer (e.g., RRC layer) of out-of-sync/in-sync status. In more detail, if radio link quality is better than Qin, the physical layer of the UE notifies the higher layer of in-sync status at a radio frame where radio link quality is assessed. In a non-DRX mode, the physical layer of the UE assesses radio link quality every radio frame, and in a DRX mode, the physical layer of the UE assesses the radio link quality at least once every DRX cycle. If higher layer signaling indicates subframe(s) for restricted radio link monitoring (RLM), the assessment of the radio link quality is not performed at any other subframe other than those indicated. Afterwards, the physical layer of the UE notifies the higher layer of out-of-sync at the radio frames where the radio link quality is assessed when the radio link quality is worse than the threshold Qout.

In case of RLM, the UE may obtain RSRP (Reference Signal Received Power)/RSSI (Received Signal Strength Indication)/RSRQ (Reference Signal Received Quality) on the basis of a received signal power at a single subframe, which is measured based on CRS transmission RE and/or CRS transmission OFDM symbols with respect to a given time/frequency domain (e.g., predetermined subframe/band), and may monitor received signal quality on the basis of the obtained result. The RSRP is defined by a linear average for power contribution (unit, W) of resource elements for carrying a CRS in a measurement frequency domain. A CRS of an antenna port 0 is used for determination of the RSRP. If the UE may reliably detect a CRS of an antenna port 1, the UE may additionally use the CRS of the antenna port 1 to determine the RSRP. The RSRQ is defined as N×RSRP/RSSI. N indicates the number of RBs of RSSI measurement bandwidth. The RSRP and the RSSI are measured at the same RB set. The RSSI indicates a linear average of a total received power observed in OFDM symbols including the CRS of the antenna port 0 in the measurement band (N RBs), and includes all source signals observed by the UE. For example, the source includes co-channel serving and non-serving cell, neighboring channel interference and thermal noise. If higher layer (e.g., RRC) signaling indicates a specific subframe for RSRQ measurement, the RSSI is measured at all OFDM symbols of the indicated subframe.

Figure 11:
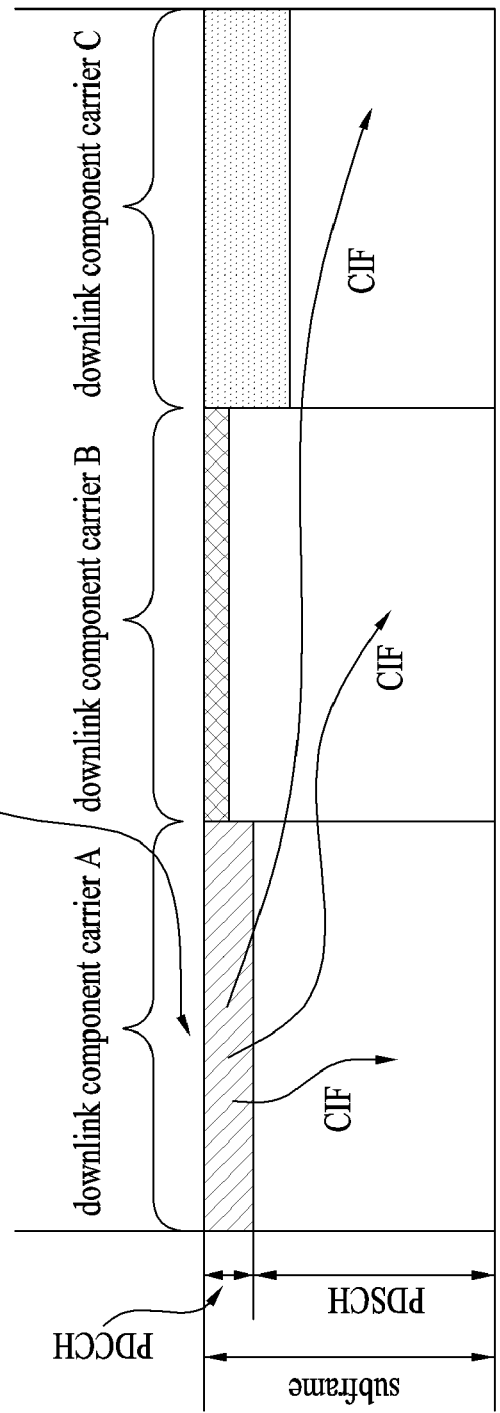
FIG. 11 is a diagram illustrating carrier aggregation.

Hereinafter, carrier aggregation will be described with reference to FIG. 11.

A 3GPP LTE (3rd Generation Partnership Project Long Term Evolution; Rel-8 or Rel-9) system (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA may be replaced with carrier matching, multi-CC environment, or multi-carrier environment.

In the present invention, multi-carrier means carrier combination (or carrier aggregation). At this time, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation.

The term CA is interchangeable with carrier combining, bandwidth aggregation, spectrum aggregation, etc. The LTE-A system aims to support a bandwidth of up to 100 MHz by aggregating two or more CCs, that is, by CA. To maintain backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using the above bandwidths only for compatibility with the legacy system. Also, the CA system used in the present invention may support CA by defining a new bandwidth irrespective of the bandwidths used in the legacy system.

Also, the above CA may be categorized into two types of CA, intra-band CA and inter-band CA. Intra-band CA means that a plurality of DL CCs and/or UL CCs are successive or adjacent on frequency. In other words, the carrier frequencies of the DL CCs and/or UL CCs are positioned in the same band. On the other hand, an environment where CCs are far away from each other on a frequency domain may be called inter-band CA. In other words, inter-band CA may mean that the carrier frequencies of a plurality of DL CCs and/or UL CCs are positioned in different bands. In this case, a UE may use a plurality of Radio Frequency (RF) ends to perform communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

Also, CA may be regarded as aggregation of two or more cells having different carrier frequencies (center frequencies). In this case, the term 'cell' should be distinguished from 'cell' as a geographical area covered by a BS. Hereinafter, the intra-band CA is referred to as intra-band multi-cell, and inter-band CA is referred to as inter-band multi-cell.

A cell used in the LTE-A system includes a Primacy Cell (PCell) and a Secondary Cell (SCell). The PCell and the SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId has an integer value ranging from 0 to 503. A short ID ServCellIndex used to identify the serving cell (PCell or SCell) has an integer value ranging from 0 to 7. The value of 0 is applied to PCell, and SCellIndex is preassigned to be applied to the SCell. That is, the smallest cell ID (or cell index) of ServeCellIndex indicates a PCell.

A PCell refers to a cell operating on a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRC connection reconfiguration message RRCConnectionReconfiguraiton including mobility control information mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may provide all system information related to operations of related cells in RRC_CONNECTED state to the UE through dedicated signaling. Changing system information may be controlled by releasing and adding a related SCell. At this time, a higher-layer RRC-ConnectionReconfiguration message may be used. The E-UTRAN may perform a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. In the following embodiment, a Primary CC (PCC) and a PCell may be used in the same meaning and a Secondary CC (SCC) and an SCell may be used in the same meaning in embodiments of the present disclosure.

Hereinafter, cross-carrier scheduling will be described.

There are two scheduling schemes, self-scheduling and cross carrier scheduling in a CA system in view of scheduling of carriers or serving cells. Cross carrier scheduling may be called cross component carrier scheduling or cross cell scheduling.

In self-scheduling, a PDCCH (DL grant) and a PDSCH are transmitted in the same DL CC or a PUSCH transmitted in accordance with PDCCH (UL grant) transmitted from DL CC is transmitted through a UL CC linked to a DL CC in which the UL grant is received.

In cross carrier scheduling, a PDCCH (DL grant) and a PDSCH are transmitted in different DL CCs or a PUSCH transmitted in accordance with PDCCH (UL grant) transmitted from DL CC is transmitted through a UL CC other than a UL CC linked to a DL CC in which a UL grant is received.

Cross carrier scheduling may be activated or deactivated UE-specifically and indicated to each UE semi-statically by higher-layer signaling (e.g., RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by using the CIF. That is, when a PDCCH on a DL CC allocates PDSCH or PUSCH resources to one of aggregated DL/UL CCs, a CIF is set in the PDCCH. In this case, the DCI formats of LTE Release-8 may be extended in accordance with the CIF. The CIF may be fixed to three bits and the position of the CIF may be fixed irrespective of a DCI format size. In addition, the LTE Release-8 PDCCH structure (the same coding and CCE based resource mapping) may be reused.

On the other hand, if a PDCCH on a DL CC allocates PDSCH resources of the same DL CC or allocates PUSCH resources on a single linked UL CC, a CIF is not set in the PDCCH. In this case, the same PDCCH structure and DCI format as those of the LTE Release-8 (the same coding and CCE based resource mapping).

If cross carrier scheduling is available, a UE needs to monitor a plurality of PDCCHs for DCI in the control region of a monitoring CC in accordance with the transmission mode and/or bandwidth of each CC. Accordingly, an appropriate search space that may support cross carrier scheduling should be configured, and PDCCH monitoring is required.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined separately irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may preferably be defined within the UE DL CC set. That is, the BS transmits a PDCCH through only the PDCCH monitoring set to schedule a PDSCH or PUSCH for the UE.

FIG. 5 illustrates a subframe structure in the LTE-A system according to cross carrier scheduling used in the embodiments of the present invention.

Referring to FIG. 5, three DL CCs are aggregated for a DL subframe for LTE-A UEs. DL CC 'A' is configured as a PDCCH monitoring DL CC. If a CIF is not used, each DL CC may transmit a PDCCH that schedules a PDSCH in the same DL CC without a CIF. On the other hand, if the CIF is used by higher-layer signaling, only DL CC 'A' may transmit a PDCCH that schedules a PDSCH in the same DL CC 'A' or another CC. At this time, no PDCCH is transmitted in DL CC 'B' and DL CC 'C' that are not configured as PDCCH monitoring DL CCs.

Hereinafter, a small cell environment will be described.

In the embodiments of the present invention, a small cell may be described as a combination of a DL resource (i.e., a component carrier) and a selective UL resource. The relationship between carrier frequencies of the DL resource and the UL resource may be indicated by the system information transmitted on a DL resource.

Hereinafter, Heterogeneous Network Deployment will be described.

Figure 12:
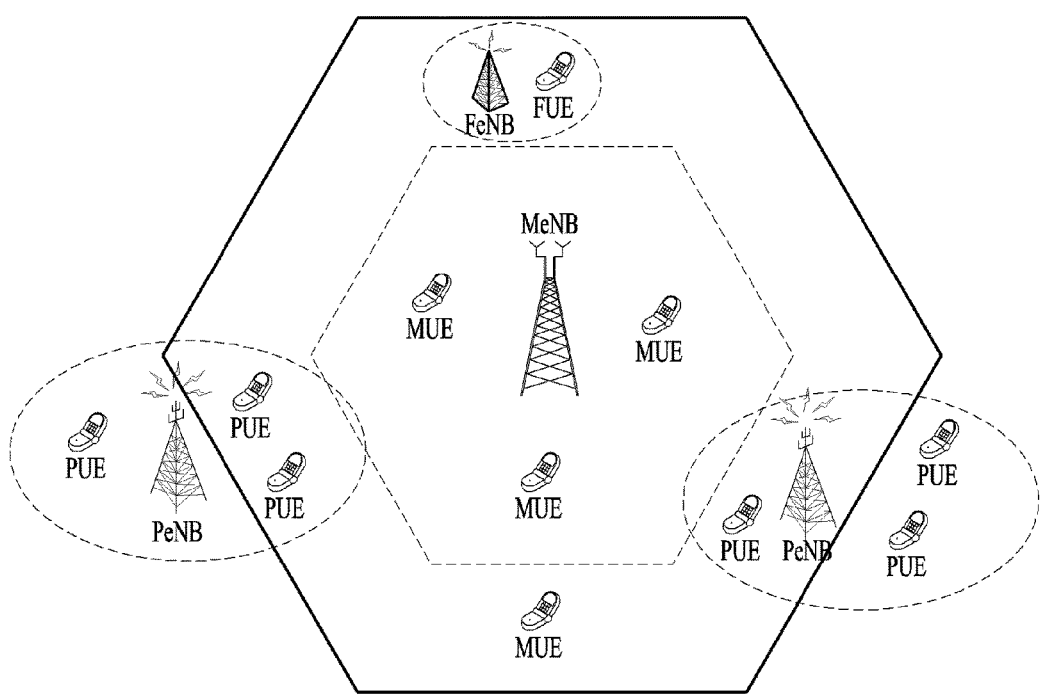
FIG. 12 is a diagram illustrating an example of heterogeneous network arrangement.

FIG. 12 illustrates an example of heterogeneous network deployment.

In the next generation mobile communication system, attention has been increasingly drawn to introduction of a hierarchical cell structure or heterogeneous cell structure in which a micro cell, a pico cell, and/or a femto cell, which are small cells for low power/short-range communication in a macro cell-based homogenous network, coexist in order to more stably ensure data services including multimedia.

This is because that additional deployment of a macro cell with the conventional BS deployment is inefficient in terms of costs and complexity compared to system performance A heterogeneous network, which is considered in the current communication networks, has a structure as shown in FIG. 12.

In FIG. 12, a BS to manage and cover a macro cell is defined as a macro eNodeB (MeNB), and a UE operating in the macro cell of the MeNB is defined as a macro UE (MUE). In addition, a BS to manage and cover a pico cell is referred as a pico eNodeB (PeNB), and a UE that is scheduled in the pico cell of the pico eNB is referred to as a pico UE (PUE). In addition, a BS to manage and cover a femto cell is referred to as a femto eNodeB (FeNB), and a UE that is scheduled by the femto BS is referred to as a femto UE.

Referring to FIG. 12, multiple micro cells may coexist in one macro cell. At this time, the micro cells are allocated with resources in accordance with the cell coordination scheme to provide a service for a corresponding UE. The micro cells are divided into two types in accordance with the access scheme.

(1) Open Access Subscriber Group (OSG) type: the OSG type micro cell is a cell that allows access of an existing macro UE or micro UEs and is capable of performing handover to a cell thereof or a macro cell. The OSG type may be referred to as a Non Closed access Subscriber Group (NCSG).

(2) Closed access Subscriber Group (CSG) type: the CSG type micro cell is a cell that does not allow access of an existing macro UE or micro UEs without authentication. Therefore, the CSG type cell cannot perform handover to the cell thereof or a macro BS.

Hereinafter, Dual Connectivity will be described.

Figure 13:
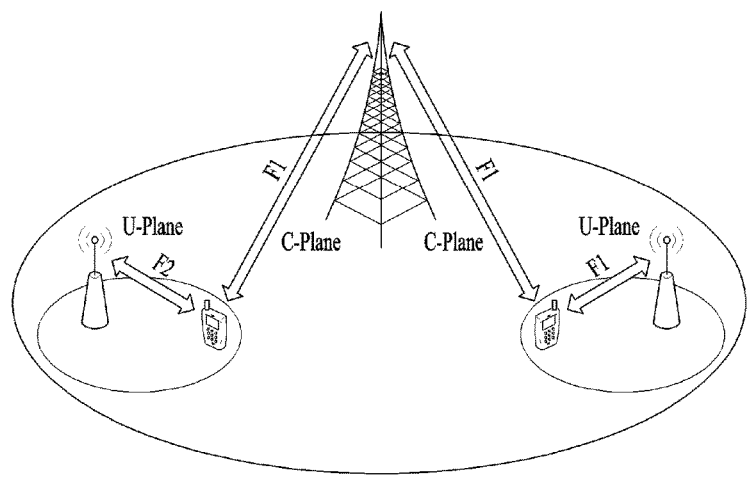
FIG. 13 is a diagram illustrating one of deployments of a UE and a base station (BS) which are performing a dual connection mode.

FIG. 13 illustrates an example of deployment of UEs and BSs which are performing the dual connectivity mode.

A macro cell and a small cell may perform carrier aggregation (CA). For example, a macro eNB may use n carriers (n is a positive integer), and a small cell may use k carriers (k is a positive integer). At this time, the macro cell and the small cell may use the same frequency carrier or different carriers. For example, the macro cell may use frequency bands f1 and f2, and the small cell may use frequency bands f2 and f3.

Dual connection or dual connectivity means that a UE positioned within the small cell coverage is connectable to the macro cell and the small cell at the same time. That is, the UE may be provided with services from the macro cell and the small cell at the same time or in accordance with a TDM scheme. For example, the UE may be provided with services of functionalities (e.g., connection management, mobility management) which are provided in the control plane (C-plane) via a macro cell layer.

In addition, the UE may select a user-plane (U-plane) data path to the macro cell and/or the small cell. For example, for a real-time data service such as VoLTE (Voice over LTE), the UE may transmit and receive data to and from the macro cell, which ensures mobility of the UE, rather than the small cell. Small cells may be densely deployed, and therefore when the UE moves among the small cells, the UE needs to frequently perform handover, which may result in interruption of services. If a UE in the dual connectivity state is provided with a best effort service (BES), the UE may be provided with the service from a small cell rather than from the macro cell. The backhaul between the macro cell and the small cell may be ideal backhaul or non-ideal backhaul.

In addition, the macro cell and the small cell may be configured by the same TDD or FDD system or by different TDD and FDD systems. For example, FIG. 13 shows a scenario in the dual connectivity mode. That is, the macro cell and the small cell may use the same frequency bands (F1, F1) or use different frequency bands (F1, F2).

A UE for which the dual connectivity mode is configured may be connected to a macro cell and a small cell at the same time. In the example of FIG. 13, a user plane data path is configured by the small cell. That is, the UE may have a control plane path for transmission and reception of a control signal which is directed to a macro BS and a user plane path for transmission and reception of downlink or uplink data which is directed to a small BS.

The aforementioned dual connectivity may be described similarly to inter-site (or inter-band) carrier aggregation in which carriers positioned at different bands are aggregated. That is, the macro cell may be referred to as PCell (Primary Cell) based on primary CC in carrier aggregation, and the small cell may be referred to as SCell (Secondary Cell) based on secondary CC in carrier aggregation.

However, it is to be understood that dual connectivity in a heterogeneous network environment should be distinguished from carrier aggregation. That is, dual connectivity between the macro cell and the small cell further includes geographical/positioning concept not carrier aggregation in a single BS. In more detail, in each of the case that the UE is located in a small cell by means of a first small cell BS and the case that the UE is located in a small cell by means of a second small cell BS, the UE is provided with a service from the macro cell BS and at the same time performs communication with a ½th small cell BS located to be detached therefrom.

Recently, a method for providing a low delay wireless communication service between the UE and the BS is under discussion. Hereinafter, in the present invention, a method for effectively performing uplink transmission in a UE even without direct resource allocation indication from a BS will be described. Particularly, this operation may effectively be used for uplink data that should be transmitted with short time delay. For example, the operation may effectively be used for transmission of data including state information of a moving vehicle of high speed.

In an uplink of general cellular communication, the BS performs an operation based on resource allocation to designate a resource which will be used for uplink data transmission for an individual UE. This is to prevent interference between transmissions from different UEs from occurring and maximize efficiency of uplink transmission as the BS allocates a proper position and a proper amount of time, frequency and/or spatial resources to the UE considering a channel state or the amount of traffic.

However, prior connection between a UE and a BS is required for operation based on resource allocation to an individual UE. That is, the UE delivers a control signal, which indicates that the corresponding UE desires to be connected to the BS to receive resource allocation, to the BS, and the BS needs to notify the UE of various configurations required for resource allocation in response to the control signal. The prior connection procedure is accompanied with certain time delay, and especially service quality may be deteriorated remarkably due to time delay occurring during the connection procedure in case of data to be transmitted with the aforementioned short time delay.

To solve the problem, an operation of the UE for transmitting uplink data without prior connection between the BS and the UE or transmission resource allocation for an individual UE may be designed. Hereinafter, this operation will be referred to as high-speed uplink resource allocation. Such high-speed uplink resource allocation may be referred to as quick uplink transmission initiation or quick uplink operation. Otherwise, the high-speed uplink resource allocation may be referred to as connection-less based transmission.

As one feature of high-speed uplink resource allocation, the BS may allocate resources shared by a plurality of UEs, and a UE, which should transmit urgent data, among the corresponding UEs, may immediately transmit uplink data without separate prior connection or additional resource allocation. For example, the UE immediately transmits uplink data by using the corresponding shared resources or some of the corresponding shared resources without individual reception of UL grant through PDCCH. In this procedure, it is impossible to perform optimized scheduling in the same manner as general uplink resource allocation. However, since the high-speed uplink resource allocation is favorable in view of time delay, the high-speed uplink resource allocation may effectively be used for a UE which needs quick transmission.

In the aforementioned description, prior connection between the BS and the UE, which is omitted on the high-speed uplink resource allocation, may mean RRC connection established between the BS and the UE. In this case, data may immediately be transmitted without RRC connection configuration or reconfiguration illustrated in FIGS. 7 and 8 in the relation with a specific cell. A camp-on state of the UE may correspond to this case. In this case, the high-speed uplink resource allocation may include a random access procedure.

For example, if the high-speed uplink resource allocation is performed, the UE which needs resource allocation may immediately transmit data, which need short time delay, without RRC connection configuration after the random access procedure. In this case, data may be transmitted during the random access procedure to reduce time delay. For example, if the UE transmits a random access preamble and the BS, which has received the random access preamble, designates a resource for transmitting PUSCH, through a random access response, the UE may transmit data by using the designated resource.

Alternatively, in the aforementioned description, prior connection between the BS and the UE, which is omitted on the high-speed uplink resource allocation, may mean connection between an entity, which is in charge of a function on a network, in addition to the BS, and the UE. For example, the prior connection may include logical connection between a network entity, which controls mobility of the UE, and the UE. In this case, the UE, which performs high-speed uplink resource allocation, transmits desired data through a minimum communication procedure with the BS without connection configuration with the network entity. As an example of the minimum communication procedure, data may be transmitted without UL grant through PDCCH, or data may be transmitted directly without logical connection with entity immediately after random access.

However, in the aforementioned high-speed uplink resource allocation, since the BS cannot control transmission of individual UE, it is preferable that the BS determines whether to grant the high-speed uplink resource allocation on the basis of various statuses. For example, in case of much traffic in which time delay may be long in a specific cell, all resources may be operated based on the existing resource allocation without grant of the high-speed uplink resource allocation, and this operation may be an optimized selection for the corresponding cell.

Therefore, the BS may notify the UE whether the high-speed uplink resource allocation is granted by a specific cell, and if the high-speed uplink resource allocation is granted by the specific cell, may notify the UE of position and amount of resources which will be used and/or various transmission parameters which will be used during grant. An example of the transmission parameters includes a parameter used for an equation for determining a transmission power. Specifically, the example of the transmission parameters includes a proportional constant multiplied by a path loss value when a transmission power proportional to path loss from the BS. Since this signaling should be delivered to a plurality of UEs, this signaling is preferably delivered through a broadcast control channel such as SIB.

Preferably, this high-speed uplink resource allocation is restrictively applied to a specific service, which needs a short time delay, for example, a service intended for detecting collision between cars or between a car and a pedestrian as a car transmits its position information to a neighboring car or a pedestrian prior to a collision timing point. In this case, a bearer to which the high-speed uplink resource allocation is applied may be designated as a specific bearer for the specific service. If data to be transmitted by the UE occurs on the specific bearer, the high-speed uplink resource allocation is applied for only transmission of such data. In this case, it is assumed that a mapping relation between the specific service and the specific bearer is configured.

If the high-speed uplink resource allocation includes a random access procedure, the information notified by the BS may include transmission resource position and/or sequence information of a random access preamble used for the high-speed uplink resource allocation or used for the specific bearer which needs the high-speed uplink resource allocation. Additionally, even in case of data generated on the specific bearer, a rule may be prescribed such that the data may be used for the high-speed uplink resource allocation only if a size of the data is a certain level or less. If data of a great size is used for the high-speed uplink resource allocation, one UE may exclusively use the excessive amount of resources prepared for the high-speed uplink resource allocation to prevent another UE from using the resources.

Meanwhile, a method for transmitting data from a UE on the basis of high-speed uplink resource allocation under several statuses will be described hereinafter. For example, if a serving cell grants data transmission based on high-speed uplink resource allocation but a neighboring cell does not grant data transmission based on high-speed uplink resource allocation, or if data transmission based on uplink resource allocation to a neighboring cell is performed for a specific reason during connection for a serving cell, a corresponding operation will be described.

First Embodiment

Hereinafter, a method capable of continuously performing uplink data transmission of low delay in a UE in a state that each cell controls whether to grant high-speed uplink resource allocation depending on a status will be described.

First of all, it is assumed that a UE is located in a specific cell which grants high-speed uplink resource allocation and transmits uplink data without connection with a serving cell BS. An example of the case that there is no connection with the serving cell includes RRC idle state or a state that connection with a network entity is not configured. If a corresponding UE moves to a neighboring cell but the neighboring cell does not grant high-speed uplink resource allocation, the corresponding UE should configure connection with the BS by performing a cell access procedure after moving to the neighboring cell and transmit data through general uplink resource allocation. Also, the UE should establish a logical connection procedure with the BS or the network entity through a procedure such as RRC connection configuration. Particularly, in this procedure, since time delay generated during cell access and logical connection may be great, service delay may occur for a certain interval during low delay data transmission of the corresponding UE, whereby service quality may be deteriorated remarkably.

To prevent service quality from being deteriorated, a UE which is likely to move to the cell which does not grant high-speed uplink resource allocation may be operated to more quickly configure connection with the corresponding cell through a handover procedure not an initial access procedure during actual movement by previously configuring connection with the BS or the network entity.

For example, if it is determined that the UE is likely to move to the neighboring cell, the UE is first connected to its serving cell and then moves to the neighboring cell, whereby the serving cell quickly processes handover. The UE may continuously transmit low delay data by using high-speed uplink resource allocation in the middle of configuring connection. To this end, each cell may first transmit a signal, which indicates whether each neighboring cell grants high-speed uplink resource allocation, to the UE.

Hereinafter, an operation corresponding to the case that the UE of RRC idle state moves to a neighboring cell which does not support high-speed uplink will be described with reference to FIG. 14.

Figure 14:
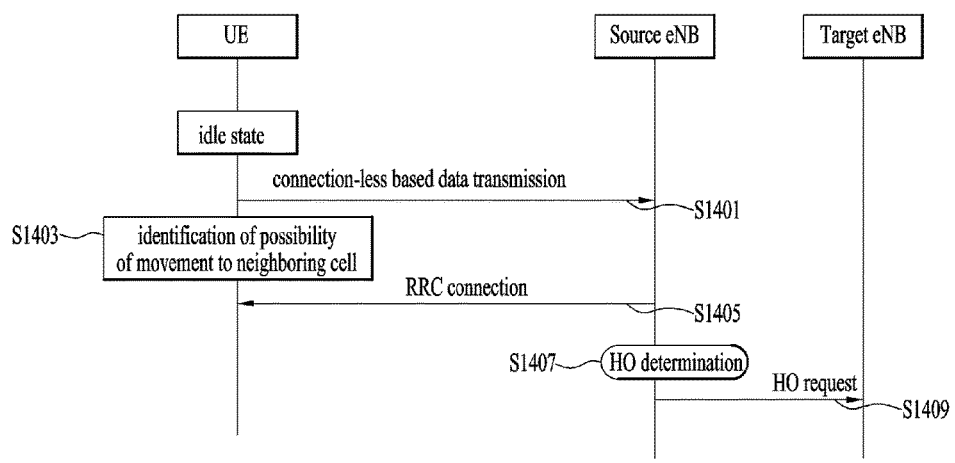
FIG. 14 illustrates a method for transmitting data when a UE of RRC idle state moves to a cell which does not support high-speed uplink transmission, as one embodiment of the present invention.

FIG. 14 is a diagram illustrating an operation of a UE for moving from a cell, which supports a high-speed uplink, to a cell that does not support a high-speed uplink, as one embodiment of the present invention.

In step S1401, the UE of RRC idle state performs high-speed uplink transmission to the serving cell. This will be referred to as connection-less based data transmission. In this case, it is assumed that the serving cell is a cell that supports high-speed uplink transmission and the neighboring cell is a cell that does not support high-speed uplink transmission. In step S1403, the UE determines whether to move to the neighboring cell. If it is determined that the UE needs to move to the neighboring cell, in step S1405, the UE performs RRC connection to the serving cell. In more detail, in step S1405, the UE transmits RRC connection request message to the serving cell. Although not shown specifically in FIG. 14, the UE receives RRC connection configuration message in response to the RRC connection request message subsequently to the step S1405. If the UE transmits RRC connection configuration complete message in response to the RRC connection configuration message, the UE is in RRC connected state.

Afterwards, the serving BS or source BS performs handover to a neighboring BS or target BS. The serving BS may determine handover in step S1407, and may request handover to the BS in step S1409. In performing the handover procedure, the steps S1001 to S1027 shown in FIG. 10 may be performed. In this case, RRC connection procedure may be performed simultaneously with or separately from the step S1001. For example, the handover request may be transmitted together with the RRC connection request message or the RRC connection complete message. Alternatively, the UE of RRC connected state may report measurement to the BS (eNB) as a separate message, or may transmit an indicator, which indicates handover, to the BS (eNB) instead of measurement report.

Meanwhile, a detailed definition of the case that the UE is likely to move to the cell which does not grant high-speed uplink resource allocation or the case that it is determined that the UE needs to move will be required. For example, if the UE measures RSRP (Reference Signal Received Power) and/or RSRQ (Reference Signal Received Quality) of each cell and then RSRP/RSRQ of a specific cell reaches a certain level or more, it is determined that the UE is likely to move to the corresponding cell, whereby the UE may perform the aforementioned operation. Hereinafter, RSRP/RSRQ may mean RSRP and/or RSRQ. For another example, if RSRP/RSRQ of the serving cell reaches a certain level or less, it may be determined that the UE is likely to move to another cell. For other example, if RSRP/RSRQ of the specific cell is higher than RSRP/RSRQ of the serving cell at a certain level or more, it may be determined that the UE is likely to move to the corresponding cell. Alternatively, the UE may complexly use the above conditions in combination.

Second Embodiment

Hereinafter, a method for transmitting data at low delay when a link status of a serving cell becomes poor in a state that the UE is connected to the serving cell and transmits data in accordance with the existing uplink resource allocation will be described.

If the link status becomes poor in a state that the UE is connected to the serving cell, it is likely that the BS fails to receive data even though the UE transmits the corresponding data. Particularly, this case may occur when the UE fails to complete handover to another cell before link quality of the serving cell becomes poor in a state that the UE moves to be far away from the center of the serving cell at high speed. At this time, if there is a neighboring cell of good quality near the corresponding UE and the corresponding neighboring cell grants high-speed uplink resource allocation, minimum low delay data may be transmitted based on the high-speed uplink resource allocation of the corresponding neighboring cell.

To this end, the serving cell may indicate whether each neighboring cell grants high-speed uplink resource allocation in the same manner as the aforementioned operation. Also, the serving cell may indicate available time, frequency and/or spatial resources for the neighboring cell that grants high-speed uplink resource allocation. Also, the serving cell may notify the UE of various transmission parameters which will be used. An example of the transmission parameters includes a parameter used for an equation for determining a transmission power.

If the UE transmits data based on high-speed uplink resource allocation of the neighboring cell, the UE should perform transmission by using timing and frequency of the corresponding neighboring cell as a reference of synchronization. Particularly, if a plurality of neighboring cells are mutually synchronized, the plurality of cells may use the same resource for high-speed uplink resource allocation as a common resource. In this case, the UE may select one of the plurality of cells and use the selected cell as a reference of synchronization.

Preferably, this operation may be applied to a case that the neighboring cell is sufficiently close to the corresponding cell. This is because that transmission of the neighboring cell acts as interference in view of the serving cell. For example, if the UE measures RSRP/RSRQ of each cell and RSRP/RSRQ of a specific cell reaches a certain level or certain threshold value or more, the UE may determine that the corresponding cell is sufficiently close thereto and perform the aforementioned operation. For another example, if RSRP/RSRQ of the serving cell reaches a certain level or certain threshold value or less, the UE may determine that the serving cell is likely to be close to another cell. For other example, if RSRP/RSRQ of a specific cell is a certain level or certain threshold value or more than RSRP/RSRQ of the serving cell, the UE may determine that the specific cell is sufficiently close to the corresponding cell. The UE may complexly use the above conditions in combination.

If these conditions are satisfied for the plurality of neighboring cells, the UE may select one having the most excellent quality among the plurality of neighboring cells and perform the following operation. Even in this case, an offset value of each neighboring cell may be compared with a measurement value to be matched with a status of each cell, for example, a level of load applied to each cell. For example, if load is different per cell, low offset is added to a cell having high load, whereby possibility of selection may be lowered.

Meanwhile, this operation may be performed restrictively only if it is determined that transmission to the serving cell is impossible due to poor link quality of the serving cell. A reference of poor link quality of the serving cell may be based on whether the aforementioned RSRP/RSRQ of the serving cell is a certain threshold value or less. Alternatively, in a series of procedures performed by the UE for communication with the serving cell, the UE may perform the above operation by assuming that link quality of the serving cell is poor for a time interval where communication with the serving cell is uncertain. As an example of the time interval where communication with the serving cell is uncertain, there is a time interval where a timer related to radio link quality is operated. In more detail, time intervals where T310, T311 and T301 are operated may correspond to this time interval.

(a) Time interval for running timer T310: T310 starts to run if a case that the UE determines that a BLER (Block Error Rate) of PDCCH transmitted from the serving cell is a certain level or more during a radio link monitoring procedure continuously occurs at a certain number of times, and stops if a case that the UE determines that the BLER is a certain level or less continuously occurs at a certain number of times. Since a channel status of the serving cell is poor such that the PDCCH cannot be received stably during running of this timer, the aforementioned operation may be granted.

(b) Time interval for running timer T311: T311 starts to run if RRC connection reconfiguration procedure starts and stops if a suitable cell is selected. Since reconfiguration has not been ended during operation of T311, transmission to the serving cell is not stable, and the aforementioned operation may be granted.

(c) Time interval for running timer T301: T301 starts to run if the UE transmits RRC connection reconfiguration request, and stops if the UE receives RRC connection reconfiguration message from the serving cell or RRC connection reconfiguration is rejected. Since reconfiguration has not been ended during running of T301, transmission to the serving cell is not stable, and the aforementioned operation may be granted.

If the random access procedure is included in high-speed uplink resource allocation, the UE may indicate a type of resource allocation required by data which will be transmitted after random access, through the random access procedure. For example, the UE may indicate whether data to be currently transmitted needs high-speed uplink resource allocation or is sufficient even for resource allocation after a general procedure, through an indicator in transmission after a random access response.

Hereinafter, an example of high-speed uplink transmission of a UE to a neighboring cell when T3XX is driven will be described with reference to FIG. 15. In this case, it is assumed that the UE is in RRC connected state.

In step S1501, the UE performs RRC connection based transmission and reception to and from the serving cell. In step S1503, the UE performs measurement for a cell. Based on the measured result, if driving of T3XX is initiated, the UE determines that transmission of the UE to the serving cell is impossible during operation of the T3XX, and performs contention-less or connection-less based data transmission to the neighboring cell in step S1505.

If the T3XX expires or its operation is stopped, a corresponding operation is performed, for example, a new serving cell is selected.

Figure 15:
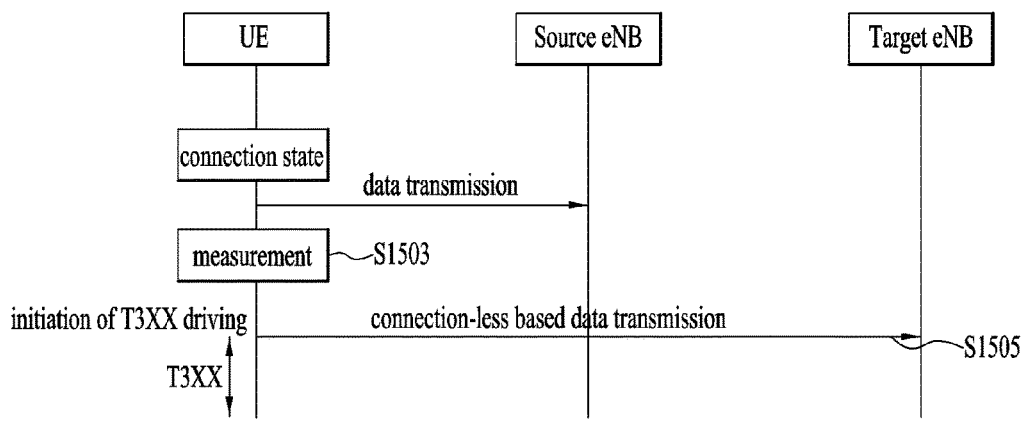
FIG. 15 illustrates a method for performing high-speed uplink transmission for a neighboring cell in a UE of RRC connected state as another embodiment of the present invention.

Meanwhile, although FIG. 15 illustrates that high-speed uplink resource allocation based or connection-less based data transmission to the neighboring cell if a timer is driven, the UE may perform connection-less based data transmission on the basis of the measured result as described above when RSRP/RSRQ of the serving cell is a certain threshold value or less.

In this case, the neighboring cell is a cell sufficiently close to the serving cell, and for example, may be a cell of which RSRP/RSRQ measured value is greater than RSRP/RSRQ measured value of the serving cell at a certain threshold value or more. In this case, resources used for high-speed uplink transmission may be time, frequency and/or spatial resources delivered from the serving cell as information on the neighboring cell.

In the aforementioned description, the serving cell and the neighboring cell may be located at the same frequency but may be located at different frequencies. Particularly, if the UE is operated by regarding the cells located at different frequencies as serving cells, in the above operation, the serving cell and the neighboring cell may be applied to a primary serving cell where RRC connection is established and controlled and a secondary serving cell used for user data transmission and reception only using RRC connection through the primary serving cell. For example, if it is determined that communication is not performed normally due to poor communication quality of the primary serving cell, low delay data may be transmitted quickly through high-speed uplink resource allocation in the secondary serving cell. For example, this method may be applied to the wireless communication system that supports dual connectivity or the wireless communication system that support carrier aggregation (CA).

Figure 16:
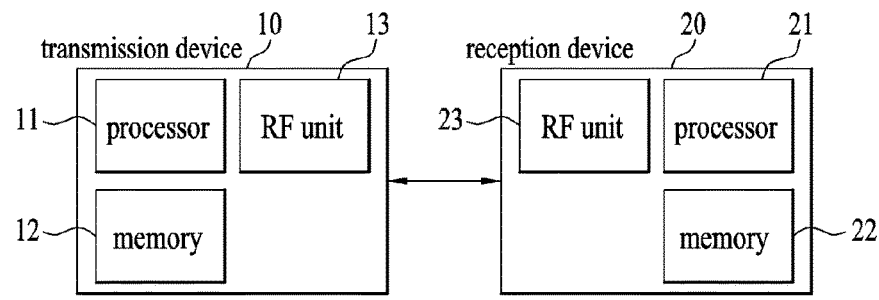
FIG. 16 is a schematic block diagram illustrating a communication apparatus according to one embodiment of the present invention.

FIG. 16 is a schematic block diagram illustrating a transmission device 10 and a reception device 20, which perform the present invention.

The transmission device 10 and the reception device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmission device or the reception device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer of 1 or more) transmitting antennas.

A signal processing process of the reception device 20 is the reverse of the signal processing process of the transmission device 10. Under the control of the processor 21, the RF unit 23 of the reception device 20 receives radio signals transmitted by the transmission device 10. The RF unit 23 may include $N_r$ receiving antennas and frequency down-converts each signal received through receiving antennas into a baseband signal. The RF unit 13 may include an oscillator for frequency down-conversion. The processor 21 decodes and demodulates the radio signals received through the receiving antennas and restores data that the transmitting device 10 intended to transmit.

The RF units 13 and 23 include one or more antennas. An antenna performs a function for transmitting signals processed by the RF units 13 and 23 to the outside or receiving radio signals from the outside to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmission device 10 in UL and as the reception device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may be operated in accordance with any one of the embodiments of the present invention. The UE processor of the present invention may be operated in accordance with any one of the embodiments of the present invention.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

INDUSTRIAL APPLICABILITY

The embodiments of the present invention may be used for a base station or UE, and other equipment in a wireless communication systems.

The invention claimed is:

1. A method for transmitting data by a user equipment (UE) in a wireless communication system supporting high-speed uplink transmission, the method comprising:
   transmitting or receiving a signal, to or from a serving cell, by the UE in a radio resource control (RRC) connected state with the serving cell;
   performing measurements for the serving cell and a neighboring cell; and
   transmitting data to the neighboring cell based on measurement values in the RRC connected state with the serving cell,
   wherein a sum of a measurement value of the neighboring cell and an offset value of the neighboring cell is greater than the measurement value of the serving cell.

2. The method according to claim 1, wherein the step of transmitting data to the neighboring cell is performed while a timer T310, T311 or T301 is running.

3. The method according to claim 2, further wherein the step of transmitting data to the neighboring cell is performed when the timer expires.

4. The method according to claim 1, wherein the step of transmitting data to the neighboring cell is performed when a measurement value of the serving cell is below a specific threshold value.

5. The method according to claim 1, further comprising:
   receiving information on the neighboring cell from the serving cell.

6. The method according to claim 5, wherein information on the neighboring cell includes at least one of information indicating whether uplink transmission is granted, a resource for transmission to the neighboring cell, and a transmission parameter for transmission to the neighboring cell.

7. The method according to claim 1, wherein a measurement value of the neighboring cell is greater than that of the serving cell.

8. The method according to claim 1, wherein the neighboring cell has a greatest measurement value among a plurality of neighboring cells.

9. The method according to claim 1, wherein the measurement values are a reference signal received power (RSRP) or reference signal received quality (RSRQ) values.

10. The method according to claim 1, wherein the data corresponds to a service mapped to a specific bearer.

11. The method according to claim 1, wherein the data is transmitted without reception of an uplink grant from the neighboring cell.

12. A user equipment (UE) in a wireless communication system supporting high-speed uplink transmission, the UE comprising:
 a transceiver; and
 a processor, operatively connected to the transceiver,
 wherein the processor is configured to:
  control the transceiver to transmit or receive the signal, to and from the serving cell, in a radio resource control (RRC) connected state with the serving cell,
  perform measurements for the serving cell and the neighboring cell, and
  control the transceiver to transmit data to the neighboring cell based on measurement values in the RRC connected state with the serving cell,
 wherein a sum of a measurement value of the neighboring cell and an offset value of the neighboring cell is greater than the measurement value of the serving cell.

* * * * *